United States Patent [19]
Gallant et al.

[11] 3,869,774
[45] Mar. 11, 1975

[54] FLUID BEARING TABLE ROLL

[75] Inventors: James O. Gallant, Rehoboth; Robert E. Staples, Lakeville; George P. Knapp, Waban, all of Mass.

[73] Assignee: Mount Hope Machine Company, Incorporated, Taunton, Mass.

[22] Filed: Jan. 28, 1974

[21] Appl. No.: 436,884

[52] U.S. Cl. ............................................ 29/116 AD
[51] Int. Cl. ............................................. B21b 13/02
[58] Field of Search .... 29/116 AD, 113 AD, 116 R, 29/110

[56] References Cited
UNITED STATES PATENTS

| | | | |
|---|---|---|---|
| 3,099,072 | 7/1963 | Robertson et al. | 29/116 AD |
| 3,225,418 | 12/1965 | Fara | 29/116 AD X |
| 3,328,866 | 7/1967 | Robertson | 29/116 AD |
| 3,386,148 | 6/1968 | Robertson | 29/116 AD |
| 3,389,450 | 6/1968 | Robertson | 29/116 AD |
| 3,516,135 | 6/1970 | Gallant et al. | 29/116 R |
| 3,587,152 | 6/1971 | Hold | 29/116 AD |
| 3,618,190 | 11/1971 | Vernazza et al. | 29/116 AD |
| 3,726,338 | 4/1973 | Sorenson | 29/116 AD X |
| 3,802,044 | 4/1974 | Spillmann et al. | 29/113 AD |

*Primary Examiner*—Alfred R. Guest
*Attorney, Agent, or Firm*—Kenway & Jenney

[57] ABSTRACT

A roll comprises a rigid annular sleeve of circular cross-section rotatably supported on a stationary axle by a series of elastomeric fluid bearing members capable of conforming to deviations from roundness of the inside wall of the sleeve. The bearing members are mounted adjustably on the axle, and are located by spacers with square-ground ends, so that they may provide accurately aligned and parallel rotational axes for the shell. The bearing members are fed with lubricating fluid by metering orifices, which open into pads on the bearing surfaces which have the same radius as the inside wall of the shell; the remainder of the bearing peripheries are relieved to permit assembly with the shell. A special arrangement of a regulating valve and by-pass valve in the fluid supply system permits a lower pressure to be applied during normal rotation of the roll, and a higher pressure to be applied to insure lifting of the shell from the pads during startup, and also at periodic intervals to clean the orifices in the bearings. A poppet valve is interposed between the supply and the orifices of each bearing, which opens to provide an increased flow rate when the higher pressure is applied, but which is biased closed against the normal lower pressure. By-pass passages in the seats of the poppet valves pass a normal lower rate of flow to the bearing orifices.

15 Claims, 13 Drawing Figures

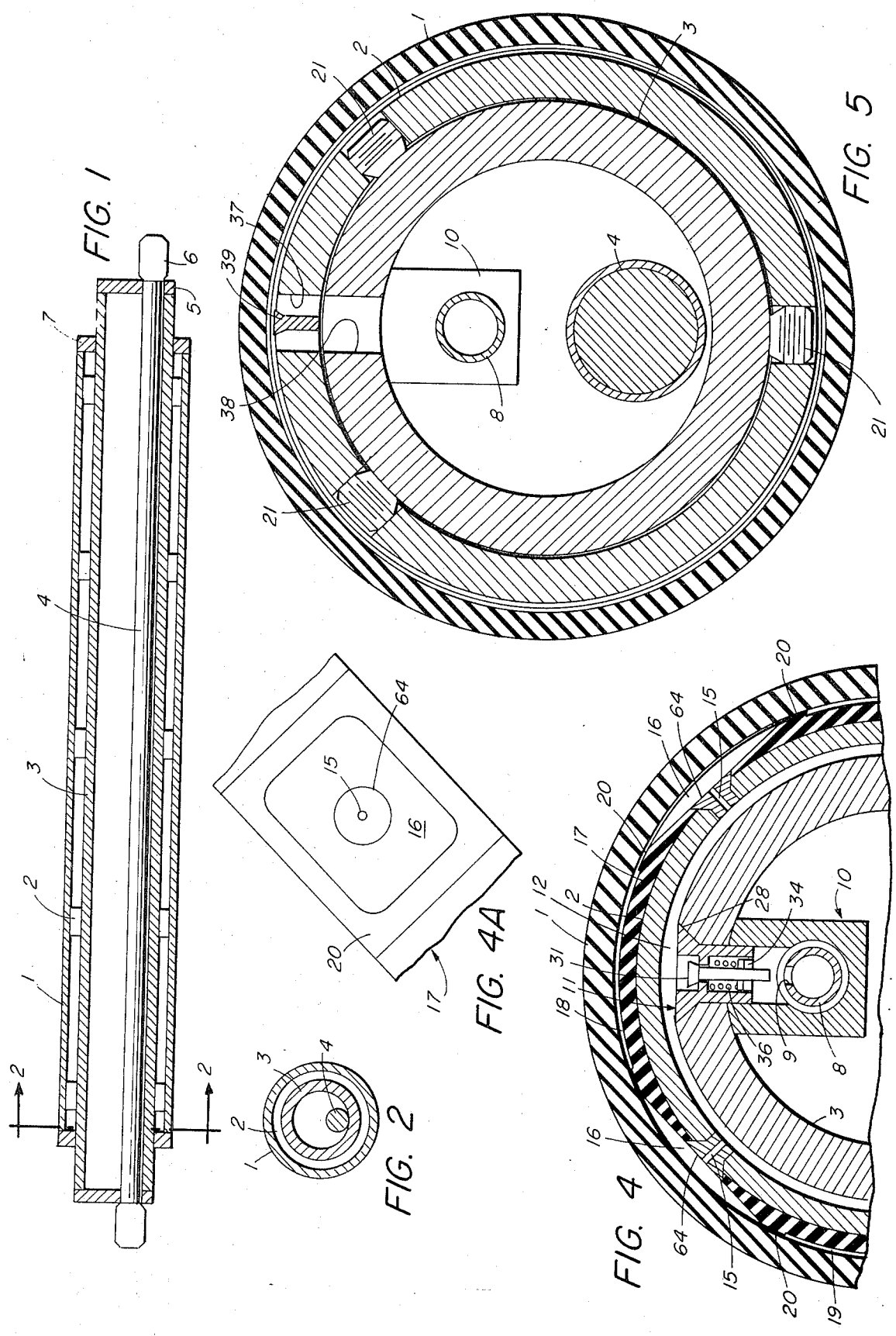

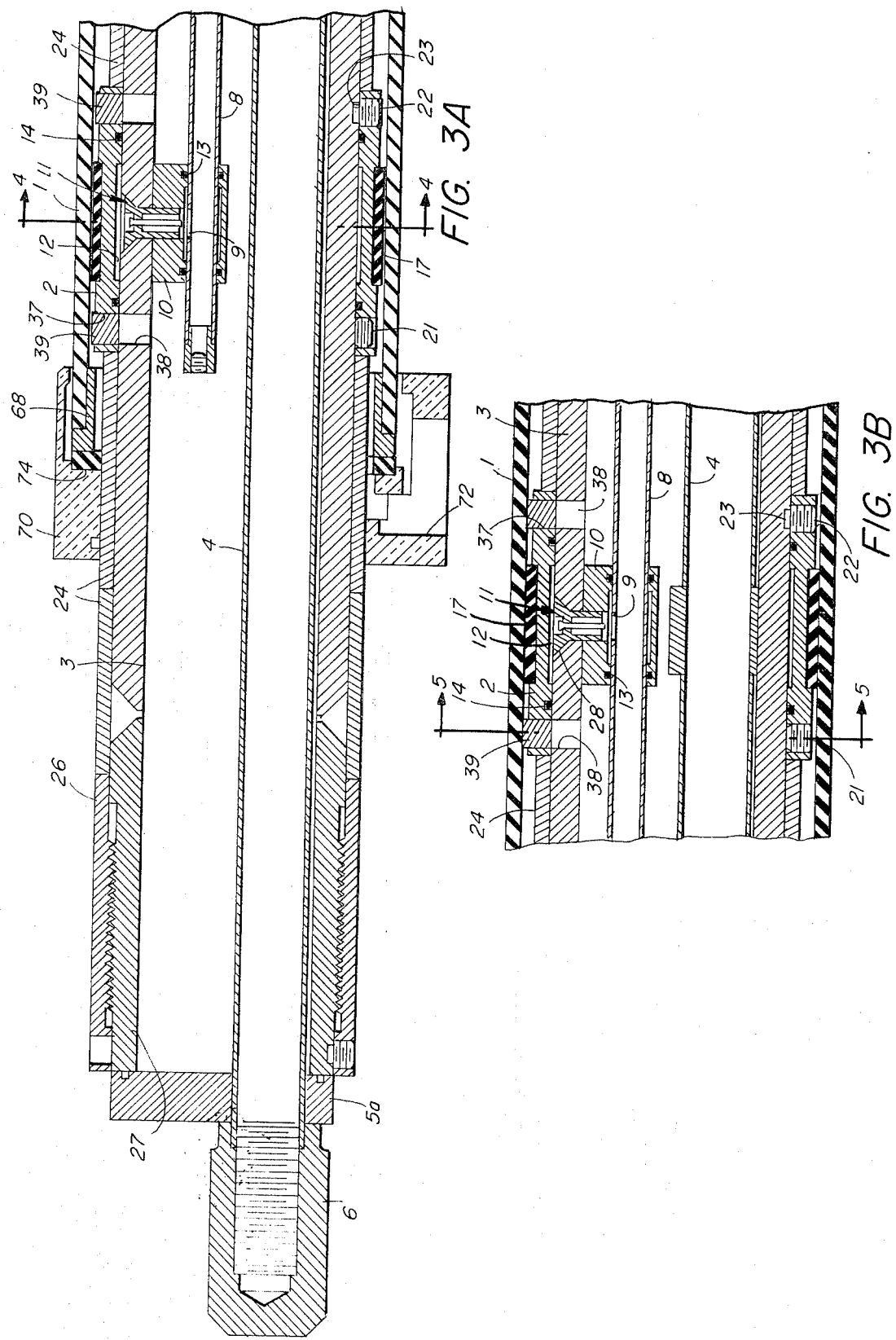

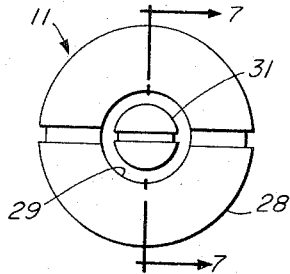
FIG. 6
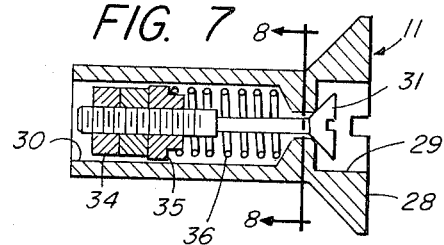
FIG. 7
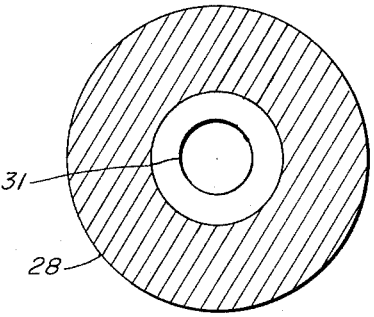
FIG. 9
FIG. 8
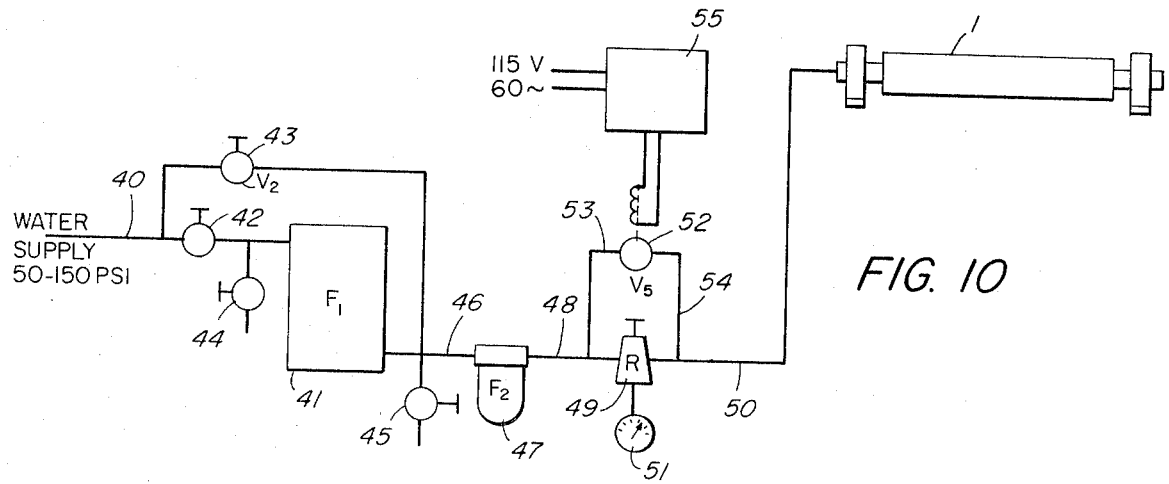
FIG. 10

3,869,774

FLUID BEARING TABLE ROLL

BACKGROUND AND BRIEF DESCRIPTION

The invention relates generally to rolls for supporting travelling webs, and more particularly concerns an improved straight roll, referred to as a table roll in the papermaking art, for supporting a web or sheet such as the wire of a Fourdrinier machine, which carries a suspension or furnish of pulp at a high rate of speed as water drains from the suspension through the wire.

Table rolls which have fluid bearings, such as those described in U.S. Pat. No. 3,386,148, issued to J. D. Robertson on June 4, 1968, which has a common assignee with the present application, have inherent and basic advantages over table rolls with conventional roller bearings. As is well known in the field of papermaking, small diameter table rolls have advantages over larger diameter rolls in that they produce less stock disturbance and permit higher machine speeds. However, in conventional table rolls having supporting journals at the ends of the roll axle, reduction of the diameter of the roll is limited by the attendant increase in the degree of sag. In addition, slender rolls tend to whip at the high speeds which must be attained in modern paper machines.

All of the small diameter table rolls which are known to be successful are of the type in which a relatively light and thin rotating shell is supported by bearings at three or more points on a relatively heavy and thick axle. Since the thickness of fluid bearings is much less than that of conventional ball or roller bearings, the shell diameter can be less for the same axle thickness if fluid bearings are used. It follows that the diameter of a liquid lubricated roll can inherently be made substantially less than that of a roll having ball bearings, which is a major advantage.

If the lubricating fluid is water, which is generally the case, there is no danger of this fluid contaminating the white water in the Fourdrinier machine, even if all the lubricating water is dumped into the pan of the Fourdrinier. And there is no danger of fluid lubricated bearings becoming contaminated by water or paper stock from the Fourdrinier, as is the case with ball bearings.

Water lubricated table rolls of the type described in the aforementioned U.S. Pat. 3,386,148 have, however, had certain limitations. Chief among these has been their relatively large consumption of clean water, typically 3 to 10 gallons per minute per roll, depending on the length of the roll. As many as 20 or more rolls are used in a Fourdrinier machine. Such quantities of filtered and/or demineralized water are not always available, and expensive and elaborate water recirculating facilities are then necessary. When attempts are made merely to cut down the amount of water supplied, the rolls can no longer be relied upon to start up from a standstill condition.

The reason for this is that the rotating outer shell of the roll cannot be a perfect cylinder. Due to manufacturing limitations, there are errors both in straightness and in cross-sectional circularity of the outer shell. This means that in a given angular position of the shell, certain bearings must carry more than their proportionate share of load while others may be carrying none; while in another angular position, the situation is reversed. In order to provide the needed lifting pressure from bearing surfaces which may not necessarily fit each other precisely, the flow through each bearing must therefore be quite substantial. In the absence of sufficient flow, there is direct physical contact between the bearing and the shell, which may actually prevent the shell from rotating, or at least cause repid wear and require excessive turning torque.

A second limitation of previously-available water lubricated rolls is a tendency for the orifices which supply water to each bearing gradually to become obstructed by residual impurities or foreign matter in the water.

Another condition observed in such rolls is the tendency for the space within the shell and the bearings to become congested with spent fluid; this causes the roll to vibrate, as is more fully described in U.S. Pat. 3,516,135, issued to J. O. Gallant et al. on June 23, 1970, which has a common assignee with the present application. While the dampers described in that patent control this condition, the turbulence of the water in this space still results in an undersirable amount of power being wasted, which manifests itself in increased turning torque requirements for the roll.

It is an object of this invention to substantially reduce the fluid flow requirements of a fluid bearing table roll.

Another object of the invention is to eliminate physical contact between the bearing surfaces of a fluid bearing table roll, with an ensuing reduction in wear.

Another object is to reduce the driving power requirements of a fluid bearing table roll.

Still another object is to provide a fluid bearing table roll which is not subject to an accumulation of material tending to block the fluid metering orifices of the roll.

Briefly stated, according to one aspect thereof, we carry out our invention in part by mounting a series of fluid bearing elements on a stationary axle in such a manner that the various bearings can be adjusted in directions transverse to the axis of the axle to bring all of them into alignment, and thus into a more uniform relation to the internal surface of an annular shell which is rotatably received on the bearings. The bearings are spaced apart by a series of annular spacers axially interposed between them, and the ends of both the bearings and the spacers are ground accurately square to their longitudinal axis, so that the rotational axes of the sleeve around all of the bearings will be in true parallelism.

The bearing assemblies each include a peripheral ring made of flexible elastomeric material, through which orifices, preferably two in number, are formed to supply lubricating fluid to the interior wall of the shell. Portions of the peripheral surfaces of the elastomeric rings which are circumferentially spaced away from the fluid orifices are relieved to a smaller radius than the interior wall of the shell, leaving a pad peripherally surrounding each orifice and ground to substantially the same radius as the shell wall. These measures assure that the relieved bearing rings do not become distorted during assembly with the shell, and that those pads which are in actual contact with the interior of the shell before rotation commences (some may not be in contact because of errors in the straightness of the shell) contact it around their entire peripheries, even though there are manufacturing errors in the roundness of the shell. This, together with the flow-limiting function of the orifices, insures that sufficient pressure can be built up over each pad which initially contacts the shell to lift the shell from the pad and give it freedom to rotate on the water film which then develops between the pad and the shell.

According to a further aspect of the invention, means for supplying pressurized fluid to the roll include valve means in which a valve member is biased closed against a normal supply pressure, and is opened by higher supply pressure. The valve seat is formed with a channel by-passing the valve member, adquate to deliver to the orifices a rate of flow of fluid sufficient for normal operation when the shell is rotating. For starting the shell rotating, and also for flushing accretions of particulate material from the orifices and other restricted passages at periodic intervals, a supply pressure higher than the normal level is made available. A regulating valve reduces this pressure to the nornally-required level, and a by-pass valve controlled either manually or by a timer transmits the higher pressure to the fluid bearings during the start-up period, and may also be actuated at periodic intervals to clean the finer passages in the supply system.

Admission of the increased pressure to the valve means opens the valve member to pass an increased rate of flow of lubricating fluid to the bearing orifices. These orifices act as flow limiters to insure that adequate pressure is made available at each bearing to lift the shell from any pads which it initially contacts when stationary, rather than escaping from any pads which happen not to contact the shell.

DESCRIPTION OF THE DRAWINGS

A preferred embodiment of the invention is illustrated in the accompanying drawings, in which:

FIG. 1 is a longitudinal cross-sectional schematic view showing the general type of roll to which the invention pertains;

FIG. 2 is a sectional view taken along line 2—2 in FIG. 1, looking in the direction of the arrows;

FIGS. 3A, 3B, and 3C are fragmentary longitudinal cross-sectional detailed views of the left end, central portion, and right end, respectively, of a roll incorporating a preferred embodiment of the invention;

FIG. 4 is a sectional view taken along line 4—4 in FIG. 3A, looking in the direction of the arrows, showing the construction of one of its fluid bearings;

FIG. 4A is a fragmentary plan view of a portion of the bearing of FIG. 4;

FIG. 5 is a sectional view taken along line 5—5 in FIG. 3B, looking in the direction of the arrows;

FIG. 6 is an end view of a valve assembly of the roll of FIGS. 3A-5;

FIG. 7 is a longitudinal cross-sectional view of the valve assembly of FIG. 6;

FIG. 8 is a sectional view taken along line 8—8 in FIG. 7, looking in the direction of the arrows;

FIG. 9 is a fragmentary cross-sectional view of a portion of the valve assembly of FIGS. 6-8; and FIG. 10 is a schematic illustration of a lubricating fluid supply system for the roll.

Figure 3C:
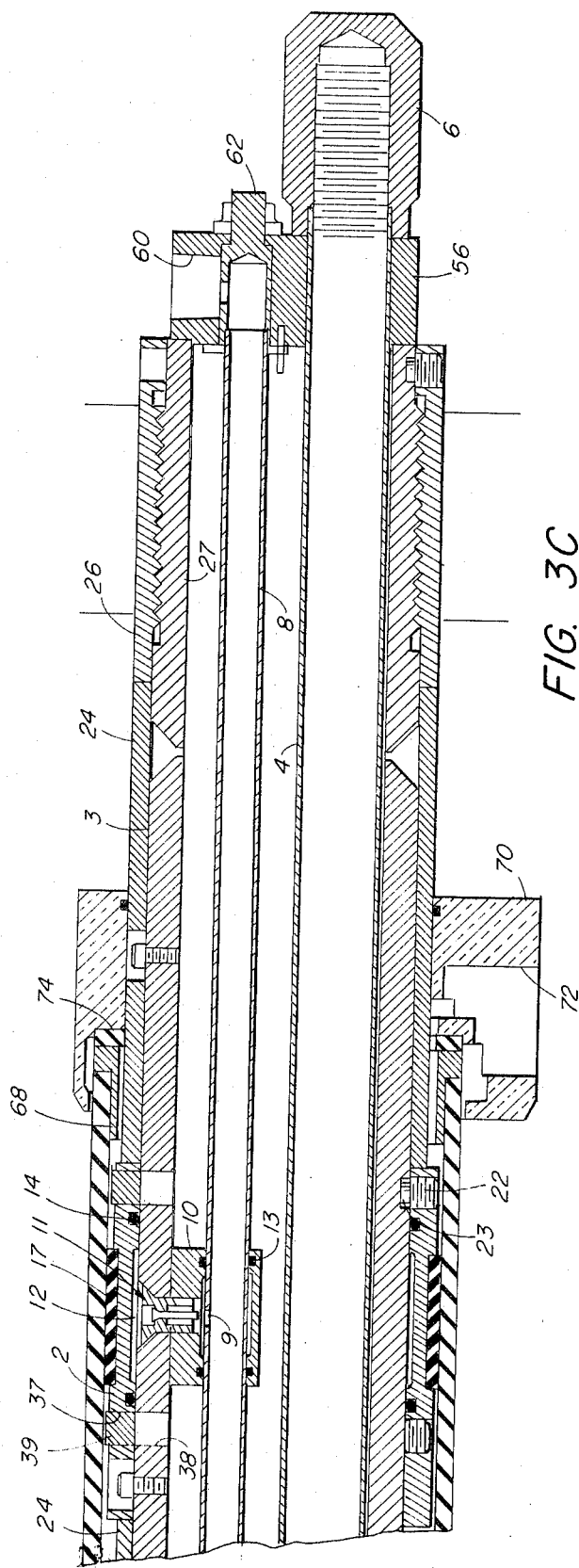

The general type of roll with which this invention is concerned is illustrated in a simplified form in FIGS. 1 and 2. A hollow cylindrical shell 1 is rotatably supported by a plurality of fluid bearings 2 mounted on a hollow cylindrical fixed axle 3, whose ends protrude in both directions beyond the shell. The roll is supported by brackets (not shown) of a conventional design, attached to the extended portions of the axle. The roll may be used, for example, to support the wire of a Fourdrinier machine, and therefore must remain straight even though it is supported only near its ends.

To accomplish this, the axle may be bowed upwardly a small amount so that the deflection produced by the weight of the roll and the external load it carries restores the axle approximately to a straight condition. A means for removing any residual deflection is illustrated, in the form of a drawbolt 4 which passes through holes in caps 5 at each end of the axle, and which can be tensioned by tightening nuts 6 threaded on the drawbolt and bearing against the caps. The drawbolt is eccentrically located with respect to the roll axis, so that tensioning the bolt 4 tends to bow the roll upwardly. This general construction is claimed and described in more detail in U.S. Pat. No. 3,094,771, issued June 25, 1963 to J.D. Robertson, and assigned to Mount Hope Machinery Company.

The construction of one of the fluid bearings 2, and the means by which water is ducted to and from it, is shown in FIGS. 3A, 3B, 3C, 4, 4A, and 5. Water under pressure is brought from a suitable source into the interior of the axle by means of an inlet passage 60 and a fitting 62 in a cap 56 at one end of the axle 3, and thence through a tube 8, which feeds all the bearings 2 in the roll. At the location of each bearing, a hole 9 in the tube 8 feeds water into a fitting 10, into which a nozzle or valve 11 is screwed through a chamfered hole in the axle 3. The construction of the nozzle assembly 11 will be described later. The water is conducted through each nozzle or valve 11 into an annular recess 12 formed in the inside of the corresponding bearing assembly 2. Leakage from the fitting 10 and the recess 12 is prevented by O-rings 13 and 14. From each recess 12, the water is ducted through orifices 15 in a pair of circumferentially-spaced nozzle inserts 64, which are received through the corresponding bearing 2 and an elastomeric bearing ring 17 bonded to its outer surface, as shown in FIG. 4. It is the preferred practice to space two orifices 15 to either side of the line of application of the supported load, which is at the top of the shell 1 as the roll is oriented in FIG. 4. Flat recesses 16 are formed in the outer surface of the ring 17 about the inserts 64. As shown in FIG. 4A, the recesses 16 are less in width than the bearing rings 17. Arcuate reliefs 18 and 19 are formed in the rings 17 so that the outer shell 1 contacts the rings 17 only in the regions of pads 20 surrounding the recesses 16.

Each bearing assembly 2 is located and supported in concentric relation to the axle 3 by three circumferentially-spaced adjusting screws 21, and is prevented from rotating on the axle by a screw 22 extending into a recess 23 formed in the axle. The bearing assemblies are positioned longitudinally of the axle by hollow cylindrical spacers 24, which fit loosely over the axle 3, as do the bearing assemblies. A stack of alternating spacers 24 and bearing assemblies 2 extends the entire length of the roll and is secured in position by nuts 26 threaded on extensions 27 of the axle 3. The ends of the elements 2, 24, and 26 are machined accurately square so that when tightened in position, their axes will all be parallel.

The construction of one of the nozzles or valves 11 is shown in detail in FIGS. 6, 7, 8, and 9. A nozzle body 28 in the form of a flat-head screw has counterbores 29 and 30 and a smaller concentric hole 30a connecting these two counterbores. A poppet 31, also in the form of a flat-head screw, with the threads removed near the head, fits loosely through the hole 30a, the edge of which has a chamfer 32 to fit the taper of the head of the poppet. A small channel 33 is formed in the conical surface of the chamfered seat 32. The poppet 31 carries nuts 34 which retain a washer 35, which in turn compresses a preload spring 36 to bias the head of the poppet 31 toward seating against the chamfer 32. In this position of the poppet, the channel 33 forms the only connection between the counterbores 29 and 30.

Referring again to FIGS. 3A, 3B, 3C, and 5, holes 37 are formed at the top of each bearing assembly 2 outboard of the O-rings 14, and these holes communicate with holes 38 formed through the wall of the axle 3. Scoops 39 are pressed into the holes 37 and extend outwardly from the bearings 2 almost to the inner surface of the shell 1.

The roll may be supplied with water by a means such as shown in FIG. 10. Water is supplied through a duct 40 to a sand filter 41. A conventional arrangement of valves 45, 42, 43, and 44 is provided to facilitate cleaning the filter 41 by backflushing. The filtered water passes through a duct 46, a second filter 47, a duct 48, a pressure-regulating valve 49, and a duct 50 to the previously-described tube 8 in the roll. A pressure gage 51 is provided to facilitate setting the regulator 49 to the desired pressure. A normally-closed solenoid valve 52 is connected in parallel with the regulator 49 through ducts 53 and 54. The solenoid valve 52 is operated by a timer 55, or manually.

In normal operation, water under a pre-established pressure is introduced through the channel 33 of each valve 11 into the recesses 16 between the elastomeric bearing rings 17 and the shell 1. This maintains a thin layer of water which, under dynamic conditions, is capable of supporting a substantial load without any actual contact between the pads 20 and the shell 1. Water which has flowed out of the area occupied by the bearings 2 collects in the spaces along the roll between bearings, and forms a more or less uniform rotating layer inside the shell 1 due to the action of centrifugal force resulting from the rotation of the shell. As the depth of this layer of water increases, it reaches a point where it is contacted by the stationary scoops 39, which are located at various points along the top of the axle. These direct the water past themselves through ducts 37 and 38 into the hollow interior of the axle, whence the water may be discharged through openings (not shown) formed in the caps 5a and 5b at the ends of the roll.

The action of the web on the rotating shell 1 ordinarily results in the shell being urged axially toward one end of the roll or the other, due to minor misalignments between the roll's axis of rotation and the direction of motion of the Fourdrinier wire. Thrust bearings capable of taking this axial reaction are provided in inserts 74 of bearing material, mounted in collars 70 attached to the stationary axle, and abutting inserts 68 received in the sleeve 1. Lubrication is provided through small water channels (not shown) formed in the inserts 68 to admit a lubricating film of water to the interface between the inserts 74 and 68. The inboard surfaces of the two inserts 74 are spaced apart by a distance greater than the length of the shell 1 with its inserts 68, to allow for differential thermal expansion of the shell 1; thus only one of the interfaces between the inserts 68 and 74 acts as a thrust bearing at a given time, with a substantial clearance existing between the elements at the other interface. The water passing through these interfaces leaves the roll through drain ports 72 formed in the collars 70.

When a previously stationary roll is to be started up, the lubricating water follows the path previously described to the recesses 16 within the shell 1. However, a uniform layer of water has not yet been established around the circumference of the bearings, and the method of creating this substantially frictionless layer of water has to be somewhat different from that for maintaining a film which has previously been established.

Initially, the stationary shell 1 is supported by direct physical contact with the pads 20 of the bearings 2. Due to inevitable departures of the inside of shell from a true cylindrical shape, some of these pads will support more than their share of the weight of the shell, and others less than their share. In fact it is possible that some of the pads may not even touch the shell. In such a case the small flow which passes through each channel 33 of the valve assemblies 11 to feed the two lifting pads at each bearing location would follow the path of least resistance, and would escape from those pads which required little or no pressure to lift off the shell, with the result that insufficient pressure would be available to lift the shell from other pads. To avoid this situation, starting is accomplished by manually energizing a solenoid valve 52, as shown in FIG. 10, which then bypasses the pressure regulator 49 and supplies high pressure to the roll. This pressure, when applied to the nozzle assemblies 11, lifts the poppets 31 from their seats 32, overcoming the force of the springs 36 and allowing a greatly increased water flow to take place. Under this condition, the orifices 15 in the nozzles 64 act as flow limiters, insuring that substantial pressure exists in the recesses 16, sufficient to lift the shell from any pad 20 which may initially be in contact with the shell.

In order for this approach to be successful, it is necessary that each pad which initially touches the shell and therefore must produce lift, originally be in contact around substantially its entire periphery with the shell. In prior art rolls this was difficult to achieve because of several factors. The bearings were often distorted out of true circularity by their shrink fit onto the axle. Also, since they were short in length, their axes could become skewed with respect to one another after installation. Further, for assembly, they had to be smaller than the inside diameter of the surrounding shell. Still further, inevitable errors in prebowing the axle resulted in the bearings being out of line with one another. Finally, the shell itself has manufacturing errors in circularity of cross-section and in straightness.

All of these difficulties have been eliminated by our new construction. The bearings may be ground with their lifting pads 20 lying on a true cylindrical surface, which does not become distorted during assembly. Their axes are not skewed to each other because the squareness of their ends, together with that of the intervening spacers 24, assures that when the stack of bearings and spacers is tightened longitudinally all of the stacked elements lie with their axes accurately parallel to one another. The adjusting screws 21 allow all the bearings to be lined up by optical means to almost any desired degree of accuracy before the shell 1 is installed. The radius of the lifting pads or lands 20 may be made to match the nominal inside radius of the shell 1, since relief is provided at all other points so that there is plenty of clearance for installing the shell. Only the inherent errors in the roundness and straightness of the inside of the shell still remain. These may amount to several thousandths of an inch error in roundness and even more in straightness. Errors in straightness present no great problem in starting the roll, since they merely mean that some bearings will have to lift more than their equal share of the load, which they can easily do. Errors in roundness, however, could result in the shell contacting one edge of a lifting pad and not the other, tending to prevent the buildup of the required pressure within the pad to lift the shell out of contact with the pad; but since the pads are made of elastomeric material, the lands 20 can deflect under load to conform to errors in circularity of the shell, so that a seal is nevertheless established, allowing the necessary lifting pressure to be developed.

In spite of the incorporation of filters in the supply line, there is still a tendency for small orifices like the orifices 33 to gradually become obstructed, either by the accretion of particles carried in the water or precipitated out of the water. The action of the valves 11 when high pressure is applied to them results not only in an increased flow of water to flush away such particles, but also in the walls of the orifices 33 being physically separated at the same time. This is accomplished periodically and automatically by means of the timer 55, which energizes the solenoid valve 52 and applies a pulse of high pressure of 1 or 2 seconds duration to the nozzles 11 at intervals of, for example, 1 hour. This keeps the orifices free and yet does not appreciably increase the low water consumption inherent in this design.

What we claim is:

1. A roll for supporting a travelling element, comprising in combination:
    a stationary axle having a rectilinear longitudinal axis;
    an annular shell of circular cross-section received about said axle;
    a series of fluid bearing elements received in axially-spaced relation along said axle and rotatably mounting said shell thereon;
    means mounting said bearing elements on said axle for adjustment transversely to said longitudinal axis thereof to permit alignment of rotational axes of said shell about each of said bearing elements;
    peripheral portions of said bearing elements being formed of elastomeric material and being formed with orifices communicating with the interior of said shell for delivering lubricating fluid thereto, said peripheral portions surrounding said orifices and having substantially the same radius as the interior surface of said shell, the remainder of the peripheries of said bearing elements being reduced to a smaller radius;
    and supply means for delivering a flow of lubricating fluid under pressure through said bearing elements to said orifices, said supply means comprising conduit means communicating with said orifices and at least one valve means interposed in said conduit means;
    said valve means including a valve member, means biasing said valve member to a closed position against a normal pressure of the supply of fluid, and a channel by-passing a normal rate of flow of fluid to said orifices around said valve member when the latter is in a closed position, said valve means being constructed and arranged to open under a pressure of the fluid greater than said normal pressure to increase the rate of flow of the fluid to said orifices above said normal rate.

2. A roll as recited in claim 1, said supply means further including a pressure-regulating valve means interposed in said conduit means ahead of said first-mentioned valve means and adapted to pass said normal pressure of the fluid supply thereto, said conduit means having a branch passage by-passing said pressure-regulating valve means, and a third valve means interposed in said branch passage and selectively operable to deliver said greater-than-normal pressure to said first-mentioned valve means.

3. A roll as recited in claim 2, together with a timer constructed and arranged for controlling the frequency and duration of opening of said third valve means.

4. A roll as recited in claim 1, said axle having a circular cross-section, said bearing elements comprising rings having a larger inside diameter than the diameter of said axle.

5. A roll as recited in claim 4, said mounting means comprising a plurality of screws threaded in each of said bearing elements and abutting against said axle, said screws being circumferentially spaced about said bearing elements.

6. A roll for supporting a travelling element, comprising in combination:
    a stationary axle having a rectilinear longitudinal axis;
    an annular shell of circular cross-section received about said axle;
    a series of fluid bearing elements received in axially-spaced relation along said axle and rotatably mounting said shell thereon;
    peripheral portions of said bearing elements being formed of elastomeric material conformable to the interior surface of said shell, said peripheral portions being formed with orifices communicating with the interior of said shell for delivering lubricating fluid thereto;
    and supply means for delivering a flow of lubricating fluid under pressure to said orifices.

7. A roll as recited in claim 6, said peripheral portions surrounding said orifices and having substantially the same radius as the interior surface of said shell, the remainder of the peripheries of said bearing elements being reduced to a smaller radius.

8. A roll for supporing a travelling element, comprising in combination:
    a stationary axle having a rectilinear longitudinal axis;
    an annular shell of circular cross-section received about said axle;
    a series of fluid bearing elements received in axially-spaced relation along said axle and rotatably mounting said shell thereon;
    means mounting said bearing elements on said axle for adjustment transversely to said longitudinal axis thereof to permit alignment of rotational axes of said shell about each of said bearing elements;
    peripheral portions of said bearing elements being formed with orifices communicating with the interior of said shell for delivering lubricating fluid thereto;

and supply means for delivering a flow of lubricating fluid under pressure to said orifices.

9. A roll as recited in claim 8, said axle having a circular cross-section, said bearing elements comprising rings having a larger inside diameter than the diameter of said axle.

10. A roll as recited in claim 9, said mounting means comprising a plurality of screws threaded in each of said bearing elements and abutting against said axle, said screws being circumferentially spaced about said bearing elements.

11. A roll for supporing a travelling element, comprising in combination:
a stationary axle having a rectilinear longitudinal axis;
an annular shell of circular cross-section received about said axle;
a series of fluid bearing elements received in axially-spaced relation along said axle and rotatably mounting said shell thereon;
portions of the peripheries of said bearing elements being formed with orifices communicating with the interior of said shell for delivering lubricating fluid thereto, each of said peripheral portions including a pad surrounding a corresponding orifice and having a uniform radius substantially the same as the adjacent portion of the interior surface of said shell, the remainder of the peripheries of said bearing elements being reduced to a smaller radius;
and supply means for delivering a flow of lubricating fluid under pressure to said orifices.

12. A roll as recited in claim 11, each of said peripheral portions having a flattened recess surrounding an orifice communicating therewith, said recess being surrounded by said pad.

13. A roll for supporing a travelling element, comprising in combination:
a stationary axle having a rectilinear longitudinal axis;
an annular shell of circular cross-section received about said axle;
a series of fluid bearing elements received in axially-spaced relation along said axle and rotatably mounting said shell thereon;
peripheral portions of said bearing elements being formed with orifices communicating with the interior of said shell for delivering lubricating fluid thereto;
and supply means for delivering a flow of lubricating fluid under pressure through said bearing elements to said orifices, said supply means comprising conduit means communicating with said orifices and at least one valve means interposed in said conduit means;
said valve means including a valve member, means biasing said valve member to a closed position against a normal pressure of the supply of fluid, and a channel by-passing a normal rate of flow of fluid to said orifices around said valve member when the latter is in a closed position, said valve means being constructed and arranged to open under a pressure of the fluid greater than said normal pressure to increase the rate of flow of the fluid to said orifices above said normal rate.

14. A roll as recited in claim 13, said supply means further including a pressure-regulating valve means interposed in said conduit means ahead of said first-mentioned valve means and adapted to pass said normal pressure of the fluid supply thereto, said conduit means having a branch passage by-passing said pressure-regulating valve means, and a third valve means interposed in said branch passage and selectively operable to deliver said greater-than-normal pressure to said first-mentioned valve means.

15. A roll as recited in claim 14, together with a timer constructed and arranged for controlling the frequency and duration of opening of said third valve means.

* * * * *

UNITED STATES PATENT OFFICE
CERTIFICATE OF CORRECTION

PATENT NO. : 3,869,774
DATED : March 11, 1975
INVENTOR(S) : James O. Gallant, Robert E. Staples, and George P. Knapp It is certified that error appears in the above-identified patent and that said Letters Patent are hereby corrected as shown below:

Column 2, line 4, change "repid" to --rapid--.

Column 3, line 4, after "opened by" insert --a--.

Column 3, line 6, change "adquate" to --adequate--.

Column 9, line 12, change "supporing" to --supporting--.

Column 9, line 36, change "supporing" to --supporting--.

Signed and Sealed this ninth Day of December 1975

[SEAL]

Attest:

RUTH C. MASON
Attesting Officer

C. MARSHALL DANN
Commissioner of Patents and Trademarks